J. ESPOSITO.
PEANUT-ROASTER.
No. 181,324. Patented Aug. 22, 1876.
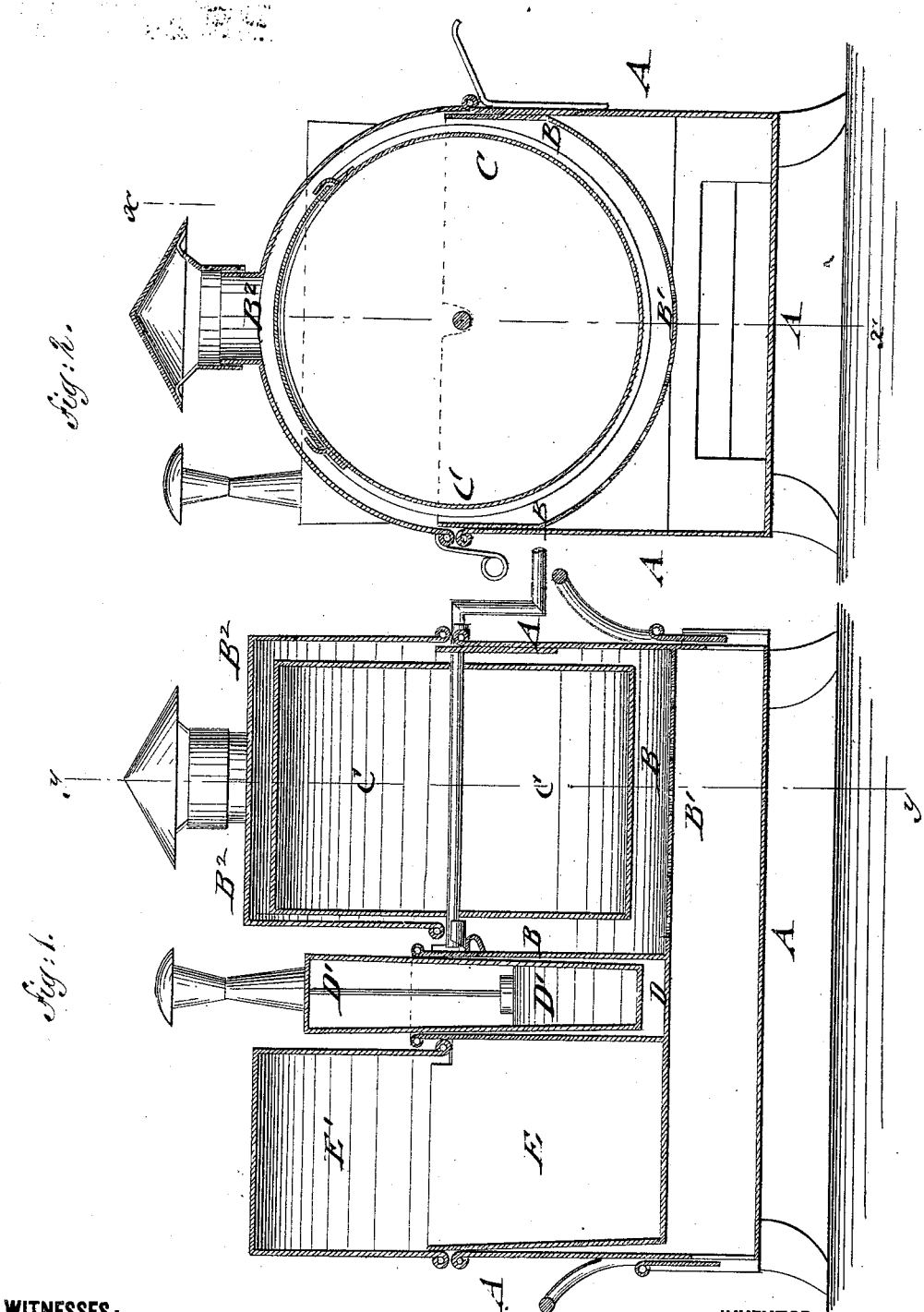

UNITED STATES PATENT OFFICE.

JEAN ESPOSITO, OF NEW YORK, N. Y.

IMPROVEMENT IN PEA-NUT ROASTERS.

Specification forming part of Letters Patent No. 181,324, dated August 22, 1876; application filed July 22, 1876.

*To all whom it may concern:*

Be it known that I, JEAN ESPOSITO, of the city, county, and State of New York, have invented a new and Improved Pea-Nut Roaster, of which the following is a specification:

In the accompanying drawing, Figure 1 represents a vertical longitudinal section on line $x\,x$, Fig. 2, and Fig. 2 a vertical transverse section on line $y\,y$, Fig. 1, of my improved pea-nut roaster.

Similar letters of reference indicate corresponding parts.

The invention consists in the improvement of pea-nut roasters by providing them with a hot-water chamber, arranged vertically in the case above the draft-passage, and between the roaster and storage-chamber.

In the drawing, A represents the outer casing of my improved pea-nut roaster, which is placed on legs in the customary manner. At one end of the casing A is arranged a receptacle, B, with bottom grate $B^1$ and revolving cylinder or drum C, into which the pea-nuts are placed for being roasted. The charcoals used for roasting are kept aglow by the draft of the ash-chamber, that extends at the bottom of casing A throughout the full length of the same, and is provided with registers at both ends for regulating the draft. The drum-receptacle B is closed at the top by a semi-cylindrical cover, $B^2$, with chimney for the escape of the vapors generated by the pea-nuts during the roasting process. The arrangement of the roasting-drum and casing is in general use in the present pea-nut roasters, and I do not lay any claim to the same. Adjoining the roasting-chamber is a smaller chamber, D, into which a water receptacle or tank, D', is placed. The tank D' is provided with a steam-whistle, an opening for filling, and a thin rod with float at lower end, by which the quantity of water in the tank is always indicated, so that the same may be kept filled up.

The remaining part of the casing A, at the end opposite to the roasting-chamber, is taken up by a storage-chamber, E, with hinged cover E', into which the pea-nuts are placed after roasting. The pea-nuts are in this storage-chamber not exposed to direct heat of the charcoals, being only heated to some extent by the heat in the ash or draft chamber at the bottom of the roaster, and by the heat of the water-tank. The tank is intended to serve as a water-bath by preventing the direct heat from the roasting-chamber from acting on the roasted pea-nuts in the storage-chamber, and producing the required temperature, so as to keep the pea-nuts for some time in the best state for eating without drying them out entirely or softening them.

The pea-nuts are transferred, after being roasted, directly to the storage-chamber, to be sold in warm and nice state from the same without keeping them too long in the roasting-drum, so as to become too dry, or allowing their getting cold after being removed from the drum, as is the case in the present roasters.

The improved roaster facilitates not only the roasting of the pea-nuts to the exact condition required, but also enables the vender to keep them for any length of time in the most salable condition without any extra trouble or expense.

Having thus described my invention, I claim as new and desire to secure by Letters Patent—

A pea-nut roaster provided with a hot-water chamber, arranged in case A vertically above the draft-passage, between the roaster and the storage-chamber, as shown and described.

JEAN ESPOSITO.

Witnesses:
  EDOUARD TAUNAY,
  PAUL GOEPEL.